Sept. 4, 1962     C. D. GILMORE     3,052,193
CUTTER DISKS FOR RECIPROCATING DOUGHNUT FORMERS
Filed Sept. 22, 1961     2 Sheets-Sheet 1
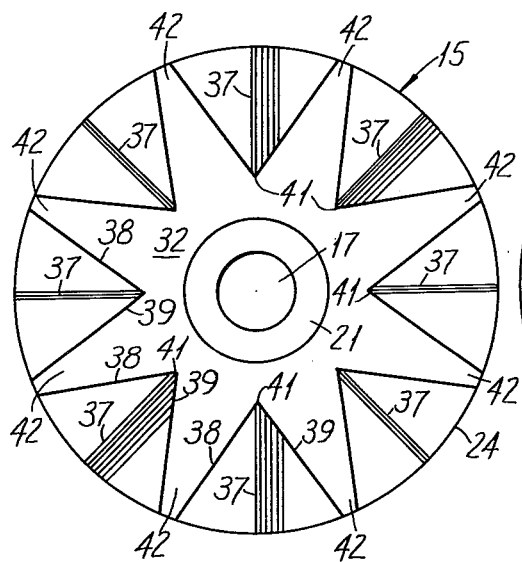
FIG. 1.
FIG. 2.
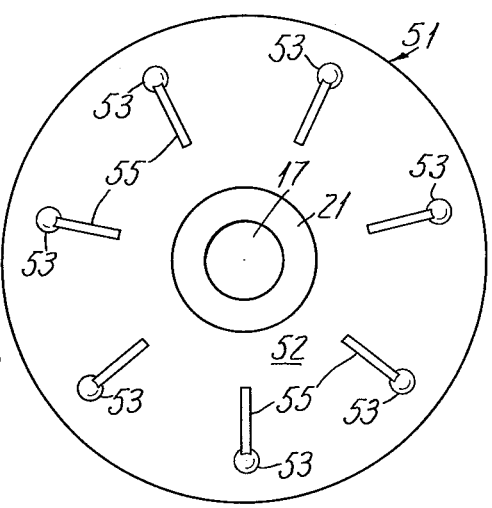
FIG. 3.
FIG. 4.
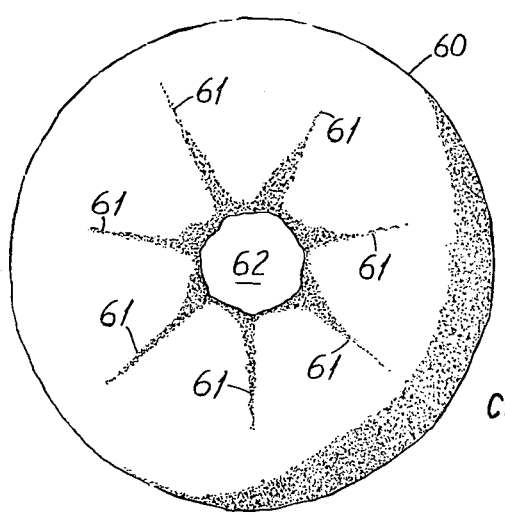
FIG. 5.
INVENTOR
CHACE D. GILMORE
BY Richard J. Cowling
ATTORNEY Sept. 4, 1962 C. D. GILMORE 3,052,193
CUTTER DISKS FOR RECIPROCATING DOUGHNUT FORMERS
Filed Sept. 22, 1961 2 Sheets-Sheet 2

INVENTOR
CHACE D. GILMORE
BY *Richard J. Cowling*
ATTORNEY

United States Patent Office 3,052,193
Patented Sept. 4, 1962

3,052,193
CUTTER DISKS FOR RECIPROCATING
DOUGHNUT FORMERS
Chace D. Gilmore, 219 S. Mechanics St.,
West Chester, Pa.
Filed Sept. 22, 1961, Ser. No. 140,043
13 Claims. (Cl. 107—14)

The present invention relates generally to doughnut formers of the reciprocating type, and it has particular relation to improvements in the construction of a cutting disk for use in such formers.

This application is a continuation-in-part of my co-pending application Serial No. 740,486, filed June 6, 1958, and now abandoned.

Heretofore, doughnut formers have been made with a fixed metal cutting disk, having smooth top, bottom and sides, which cooperates with a reciprocating tubular cutting sleeve to cut and shape raw dough forms into rings for deep-fat frying. The metal-to-metal contact of the cutting edge of the reciprocating cutter sleeve with the peripheral cutting edge of the metal disk causes frequent wear-and-tear of one or both parts, requiring replacement or complete renovation of the former. When appreciable wear occurs, the former does not have a tendency to cut cleanly and uniformly the raw dough, but either leaves strings of uncut dough or cuts the dough forms in undesirable irregular rings of varying sizes.

The present invention not only provides an improved cutter disk for reciprocating formers which obviates all of the inherent disadvantages of the above described metal disks, but also provides a disk with dough rubbing or stroking features capable of shaping and creasing the upper surface of the raw dough ring so that it will bake as quickly and evenly around its axial hole as around its outer periphery. This rubbing and/or stroking action controls the distribution of the dough in the raw dough ring so as to insure uniform expansion and even cooking immediately adjacent the hole, whereby perfect guidance is assured for the expansion of the uncooked dough to form a regular pattern on the finished product, which is not only desirable but indicates even expansion and even cooking throughout the dough ring to the eye of the purchaser.

An object of the present invention is to provide a cutting disk for a conventional reciprocating doughnut former, which has an undulating upper surface capable of marking or creasing the lower surface of the severed raw dough ring without breaking its skin formation thereon.

A further object of the invention is the provision of a cutting disk of the character described, which is provided with circumferentially spaced and radially extending protuberances in the form of ridges that will crease the lower surface of the raw dough as it is cut into individual dough rings suitable for frying into a conventional doughnut.

Another object of the invention is to provide a cutting disk of the character described with an uneven surface of spaced raised ridges capable of stroking the under side of a separated raw dough ring as it is being formed with a series of circumferentially spaced radially extending creases that will assist in the proper expansion and even cooking of the raw dough ring around its center hole when it is dropped into the hot cooking oil.

A further object of the invention is the provision of a flexible cutting disk of the character described, having a series of circumferentially spaced integrally formed cylindrically shaped protuberances provided with radially extending raised inwardly tapering fins, ribs or flanges capable of stroking the lower surface of the separated raw dough ring as it is formed with a series of circumferentially spaced radially extending creases, each fin or rib slopes upwardly outwardly, increasing in height as it approaches its protuberance to assist in the proper expansion and even cooking of the raw dough ring when it is dropped into the hot cooking oil.

Other and further objects and advantages of the invention reside in the detailed construction of the several disks, which result in simplicity, economy and efficiency, and which will be readily apparent from the following detailed descriptions, wherein preferred forms of embodiment of the invention are shown, reference being had to the accompanying drawings, forming a part hereof, wherein like numerals indicate like parts, in which:

FIGURE 1 is a top plan view of a flexible cutting disk embodying the principles of my invention;

FIGURE 2 is a side elevational view, partially in cross-section, of the cutting disk shown in FIGURE 1, the same having been taken substantially along its transverse axis;

FIGURE 3 is a top plan view of a flexible cutting disk having the basic structure of the disk shown in FIGURE 2, but being provided with a modified upper surface;

FIGURE 4 is a side elevational view of the cutting disk shown in FIGURE 3;

FIGURE 5 is a top plan view of a cooked doughnut showing the radial symmetrical design caused by the creases formed by the radial ridges or ribs on the upper surface of the cutting disks at the time of severing the raw dough ring into a separate raw dough form.

Figure 6:
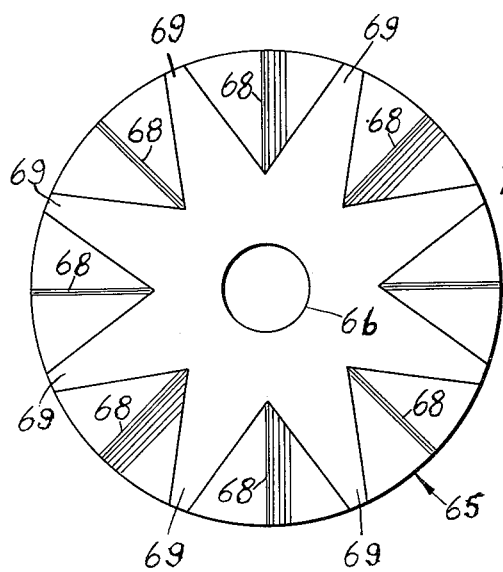
FIGURE 6 is a top plan view of a cutting disk embodying the principles of my invention wherein the entire disk is made of metal.

Referring now to the drawings, there is shown in FIGURES 1 and 2 a flexible cutter disk 15 of the type capable of use with a conventional reciprocable tubular cutting sleeve (not shown). The disk 15 is substantially flat and of a cylindrical shape, having a relatively large diameter as compared to its thickness, and includes a metal core 16, preferably of cold rolled steel or any other suitable metal or solid material, having a dome shaped or a convex top side and a relatively small bore 17 extending axially therethrough and a relatively large axial counterbore 18 extending inwardly from its bottom (see FIGURE 2). The bore 17 is adapted to slide over the lower reduced free threaded end of the depending stem of a conventional cutter. A nut (not shown) is screw-threaded over the reduced threaded end to secure the disk 15 against a shoulder formed on said stem by its reduced threaded end, and, when tightly fitted thereon, the fastening nut is entirely within the relatively large recess or counterbore 18.

An envelope, casing or covering 19 of a suitable tough elastic or resilient material, as for example an oil resistant synthetic rubber such as neoprene, buta-diene or other suitable material, is bonded to the exterior surface of the core 16 in any manner, as for example by vulcanization, so completely as to cover the exterior surfaces thereof except for the top area 21 adjacent the bore 17 and bottom area 22 forming the base of the counterbore 18. These surfaces are obviously not covered with said flexible material in order to provide a hard surface against which the cutter disk 15 may be drawn tightly and rigidly between the shoulder on the lower end of the stem and its fastening nut (not shown).

The casing or envelope 19 extends beyond the peripheral edge 23 of the metal core 16 to provide a peripheral cutting edge 24, which is flexible with respect to the remainder of said cutting disk 15. It will be obvious that the cutting edge 24 provides a flexible, sealable and yielding contact with the lower knife edge of a conventional reciprocating cutting sleeve, thereby providing a shearing contact therewith and a wiping action with the inner surface of said sleeve.

The cutting edge 24 is shown provided with a series of alternately spaced annular peripheral ribs 26 and grooves 27, which further increases the flexibility of said cutting edge and provides less frictional drag while improving its flexing, sealing and wiping action over the inner surface of the longitudinally reciprocating cutting sleeve. This feature of the disk forms the subject matter of my copending application Serial No. 140,044 filed September 22, 1961 herewith.

It will be noted that the upper or top surface area of the disk 15 is substantially dome-shaped, whereby it slopes or tapers downwardly and outwardly from the top and flat plain area 21 of the metal core 16, as indicated at 32, and that the opposite or bottom surface area tapers downwardly and inwardly, as indicated at 34. A raised ring or buffer area 36 is provided adjacent the counterbore 18 to protect the disk 15 against damage in the event the cutter assembly is bumped or dropped accidentally after it is removed from its former, as for cleaning purposes or changing sizes.

The entire upper dome-shaped surface 32 of the disk 15 is provided with a series of spaced protuberances of triangular shape, having ridges 37 extending radially inwardly from the outer perimeter thereof. It will be noted that the top limits of said protuberances lie within the limits of the top plane surface of said disk 15. Each ridge 37 has oppositely sloping sides 38 and 39. The base of each protuberance is arcuate and in substantial alignment with the peripheral edge of said disk 15. The lower edges of the sides 38 and 39 of each ridge converge at a point 41 spaced from said plain area 21, thereby forming a valley 42 between adjacent ridges 37. It will be noted that the sides 38 and 39 of each ridge 37 converge inwardly, thereby forming valleys 42 that converge outwardly.

The upwardly projecting arcuate peripheral edge of each of the protuberances is tapered slightly inwardly, as best shown at 43 in FIGURE 2. Since the peripheral edge 24 of the disk 15 is the only part engaged by the reciprocating cutting sleeve of a conventional cutter (not shown), it will be obvious that this slight taper will provide a smooth, easy and frictionless lead-in for the sleeve to become axially aligned with said disk 15 before its flexible cutting edge 23 comes into full sealing and yielding cutting contact with the inner surface of said sleeve.

Referring now to FIGURES 3 and 4, the basic construction of the modified cutting disk 51 is identical to that of cutting disk 15, except for the shape of the raised surface ribs on the top surface area thereof. In the cutting disk 51, the dome-shaped top surface area 52 is provided with a series of circumferentially spaced projections 53, which are of a cylindrical shape in cross-section, having a conical top 54. An integrally formed upstanding fin, rib or flange 55 extends radially inwardly from each projection 53. Each flange 55 is narrower in width than the diameter of its projection 53, and its top side, which is of less height than the projection, tapers inwardly and diminishes at a point intermediate the projection 53 and the upper plain area 21.

The protuberances having the ridges 37 of the disk 15 and the projections 53 with its integrally formed flanges 55 serve substantially the same purpose in substantially the same way. These upwardly extending areas serve to stroke, rub and crease the contacting areas of the raw lower dough surfaces with which they are in contact at the time the dough ring is formed and severed. The creases or indentations so made in spaced relation circumferentially of the lower surface of the raw dough ring extend radially inwardly thereof. Obviously, the dough ring will have corresponding indentations, which do not break the surface skin formation on said raw dough ring, but do reduce its vertical cross-sectional thickness along such lines. If the surface skin of the dough ring is actually cut along these radial lines or at any other place during its formation, there will be an extreme and undesirable amount of oil absorption at these ruptured points in the finished doughnut. At each crease or valley formed in the lower surface of the raw dough ring reduces the dough volume or thickness of the dough along such lines, they insure more uniform expansion and more uniform cooking in the hot oil. These creases, extending radially inwardly to the axial opening in the raw dough form, provide a perfect guidance as to the pattern the uncooked dough ring will follow when it contacts the hot cooking oil. The period between the time the dough ring is severed by the cutting disk and it contacts the hot cooking oil is extremely short. Generally, the cutters are operated only a few inches above and directly over the hot cooking oil, and the time involved is only that required for the dough rings to gravitate a few inches. When the raw dough ring falls into the hot cooking oil, it submerges momentarily until the hot oil causes sufficient expansion of the raw dough to give it buoyancy. With the creases and/or indentations formed in the raw dough rings immediately prior to cooking, such weakening lines give the expanding ingredient used in the dough formula, such as baking powder, a free and equal opportunity to expand the dough evenly and uniformly in the area surrounding the hole as well as at the peripheral area, where it always has freedom to expand. There has been considerable dissatisfaction with the doughnuts made with conventional cutters having no stroking or marking features, because quite frequently the area surrounding the hole does not expand uniformly, thereby leaving small internal lumpy areas where the dough did not get cooked completely. This has been due to inability of the dough in this area to expand easily and uniformly. The stroking action provided by the cutters 15 and 51 gives the finished doughnut 60 shown in FIGURE 5 a desirable star formation, caused by its radial crevices or valleys 61 around the hole 62. This is a very desirable design feature that is highly valued and recognized for when the arrangement is uniform it denotes uniform expansion and cooking. In a conventional doughnut made from conventional cutters of the prior art, which have no preformed streaks or crevices in the raw dough ring, the cooked doughnut will also have some radial streaks converging inwardly at its axial hole, but these will not be uniformly spaced nor will they be of a uniform pattern. The number of radial lines or crevices formed by the expansion of the dough ring in cooking will vary in different doughnuts. Some lines will extend from the outer edge only part way inwardly, indicating that the area where no line appears adjacent the hole did not cook properly or evenly.

The cutting disks 15 and 51 of this invention, having a flexible edge, do not become nicked or damaged at their peripheral cutting edge when the dough cutter assembly is removed as a unit from the former and laid on a table or other supporting surface, as when such cutters are removed for cleaning or changing to a different size. Nicking had been a frequent form of damage occurring with the conventional metal disks. Manifestly, nicks formed in the peripheral edge of a cutting disk will show up in the finished product in the form of a ridge or string of dough.

Figure 7:
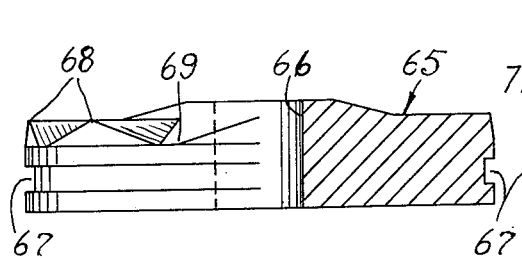
FIGURE 7 is a side elevational view, partially in cross-section, of the modified disk shown in FIGURE 6, the same having been taken substantially along its transverse axis.

The novel and undulating features of the present invention can be embodied in a standard conventional metal cutting disk 65, which is shown in FIGURES 6 and 7. Such a disk 65 is identical in shape to the disks 15 and 51, and is provided with an axial aperture or bore 66 by which it can be mounted, as by welding, etc., to the lower end of a depending stem (not shown) of a manually operable cutter of the type shown in United States Letters Patent No. 2,643,621, issued June 30, 1953. This type of cutting disk 65 is also provided with deep annular sealing groove 67, which obviously will reduce its area of frictional contact with the inside surface of its die tube (not shown). The top and dome-shaped surface area of the disk 65 is provided with an undulating surface area consisting of alternately spaced ridges 68 and valleys 69, which radiate inwardly from a point adjacent its peripheral edge to a diminishing point spaced outwardly from its bore 66. It will be noted that the sides of the ridges 68 converge inwardly and that the sides of the valleys 69 converge outwardly. This form of undulating surface area will provide a suitable stroking or rubbing action on the bottom surface of a raw dough form while it is being formed and cut into a finished raw dough ring. Such all metal disks 65 usually last the lifetime of such machines since the operator does not recognize wear and tear and has no serious objection to varying sizes and shapes of the final product.

Figure 8:
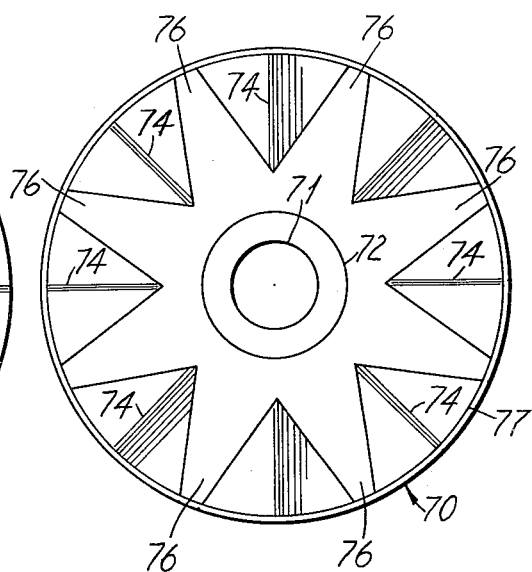
FIGURE 8 is a top plan view of another modification which the invention may assume, wherein only the top surface area is provided with a flexible covering.
Figure 9:
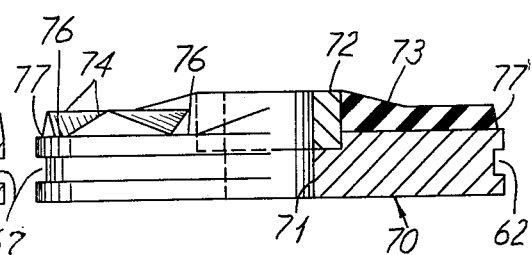
FIGURE 9 is a side elevational view, partially in cross-section, of the modified disk shown in FIGURE 8, the same having been taken substantially along its transverse axis.

There is shown in FIGURES 8 and 9 another modification which may be incorporated in the metal cutting disk of the type shown in FIGURES 6 and 7. In this modification the disk 70, having an axial bore 71 and an enlarged counter-bore 72, is provided on its top dome-shaped or convex side only with a covering of a tough oil resistant flexible material 73 bonded thereto. It will be noted that the top covering material 73 has an undulating surface consisting of alternately spaced ridges 74 and valleys 76 radiating inwardly from a point adjacent its peripheral edge. The sides of the ridges 74 converge inwardly and the sides of the valleys 76 converge outwardly. It will be noted that the bonded top tough oil resistant flexible material 73 does not extend outwardly to meet the pheripheral edge of the metal disk 70, but stops just short thereof, as indicated at 77. This construction prevents frictional contact of the flexible material 73 against the inner side of the die tube within which the disk 70 operates. Manifestly, the edges of the material 73 will not be worn down frictionally through contact with its die tube. The disk 70 is also provided with a deep annular sealing groove 62. The modified disk 70 will likewise provide a flexible stroking or rubbing action on the bottom surface of the raw dough while it is being formed and cut into a dough ring.

Although only four modifications of the invention have been shown and described in detail, it will be readily apparent to those skilled in the art that the invention is not so limited, but that various other modifications may be made therein without departing from the spirit thereof or from the scope of the appended claims.

What I claim is:

1. A cutting disk for making doughnuts with formers of the character described having a reciprocating cutter sleeve comprising:
    (1) a substantially flat disk of cylindrical shape having a relatively large diameter as compared to its thickness and being provided with an axial bore for receiving a mounting stem,
    (2) said disk having a series of circumferentially spaced integrally formed raised protuberances on its top surface area,
    (3) said protuberances extending radially and being of a substantial length as compared to their height, and
    (4) each of said protuberances including a ridge extending radially of said top surface area which is capable of streaking and creasing a dough formation being severed without breaking its skin formation to insure uniform cooking of the dough mass around the hole in the cooked doughnut.

2. A cutting disk for making doughnuts with formers of the character described having a reciprocating cutter sleeve comprising:
    (1) a disk of cylindrical shape having a relatively large diameter as compared to its thickness and being provided with an axial bore for receiving a mounting stem,
    (2) said disk having an upper surface which tapers downwardly and outwardly from said bore,
    (3) said upper surface having a series of circumferentially spaced and integrally formed raised protuberances extending radially,
    (4) said protuberances being of a substantial length as compared to their height, and
    (5) said protuberances being capable of streaking and creasing the dough formation being severed without breaking its skin formation to insure uniform cooking of the dough mass around the hole in the cooked doughnut.

3. A cutting disk for making doughnuts with formers of the character described having a reciprocating cutter sleeve comprising:
    (1) a substantially flat disk of cylindrical shape having a relatively large diameter as compared to its thickness and being provided with an axial bore for receiving a mounting stem,
    (2) said disk having a series of circumferentially spaced integrally formed raised protuberances on its top surface area,
    (3) said protuberances being of a substantial length as compared to their height,
    (4) the top limits of said protuberances lying within the limits of the top plane surface of said disk, and
    (5) each of said protuberances having a ridge extending radially of said top surface area which is capable of streaking and creasing a dough formation being severed without breaking its skin formation to insure uniform cooking of the dough mass around the hole in the cooked doughnut.

4. The cutting disk defined in claim 1, wherein the protuberances are each in the form of cylindrically shaped upwardly extending projections having an integral diminishing rib extending radially inwardly towards said axial bore.

5. A cutting disk for making doughnuts with formers of the character described having a reciprocating cutter sleeve comprising:
    (1) a cylindrically shaped disk of a substantial diameter as compared to its thickness having an axial bore for receiving a mounting stem,
    (2) the top surface of said disk being substantially convex from a distance spaced outwardly from said axial bore and extending towards its peripheral edge,
    (3) the convex surface of said disk having a covering of a tough oil resistant flexible material bonded thereto,
    (4) the convex surface of said disk having a plurality of circumferentially spaced and radially extending protuberances, and
    (5) said areas being higher adjacent said peripheral edge and diminishing inwardly as they approach said axial bore.

6. The cutting disk defined in claim 5, wherein the raised areas are in the form of radially extending ridges having downwardly and oppositely sloping sides.

7. A cutting disk for making doughnuts with formers of the character described having a reciprocating cutter sleeve comprising:
    (1) a cylindrically shaped core of a solid material having a substantial diameter as compared to its thickness and provided with an axial bore for receiving a mounting stem,
    (2) said core having a covering of a tough oil resistant flexible material bonded thereto on its opposite sides and enclosing its peripheral edge to provide a flexible extension therefor, and
(3) the covering on the top surface of said core having an undulating surface consisting of alternately spaced ridges and valleys radiating inwardly from its peripheral edge.

8. A cutting disk for making doughnuts with formers of the character described having a reciprocating cutter sleeve comprising:
(1) a cylindrically shaped core of a solid material having a substantial diameter as compared to its thickness and provided with an axial bore for receiving a mounting stem,
(2) said core having a covering of a tough oil resistant flexible material bonded thereto on its opposite sides and enclosing its peripheral edge to provide a flexible extension therefor,
(3) the top surface of said disk being convex from a distance spaced outwardly of its axial bore and extending towards its peripheral edge, and
(4) the covering on the top surface of said core having an undulating surface consisting of alternately spaced ridges and valleys radiating inwardly from its peripheral edge.

9. A cutting disk defined in claim 8, wherein the sides of the ridges converge radially in one direction and the sides of said valleys converge radially in the opposite direction.

10. A cutting disk defined in claim 8, wherein the peripheral edges of said ridges are inclined inwardly to facilitate alignment with its cutter sleeve.

11. A cutting disk defined in claim 8, wherein the ridges extend radially of said disk and decrease in height as they extend inwardly to a point where they have diminished before reaching said axial bore.

12. A cutting disk defined in claim 8, wherein the ridges extend radially of said disk and decrease in width as they extend inwardly to a point where they have diminished before reaching said axial bore.

13. A cutting disk defined in claim 8, wherein the ridges extend radially of said disk and decrease in height and width as they extend inwardly to a point where they have diminished before reaching said axial bore.

References Cited in the file of this patent
UNITED STATES PATENTS

| | | |
|---|---|---|
| 2,126,416 | Schlichter | Aug. 9, 1938 |
| 2,148,236 | Hanle | Feb. 21, 1939 |
| 2,635,560 | Coyne | Apr. 21, 1953 |